Patented Aug. 4, 1942

2,291,704

UNITED STATES PATENT OFFICE 2,291,704

METHOD OF PACKING FOOD PRODUCTS

George A. Fisher, Indianapolis, Ind.

No Drawing. Application March 30, 1939,
Serial No. 264,978

12 Claims. (Cl. 99—154)

The present application relates to methods of packing and preserving vegetable food products or vegetables comestibles, the two terms being used interchangeably. By these terms I mean to include all food products of the vegetable kingdom; viz., fruits, berries, edible roots, plants, and seeds, and the like. It is a primary object of the invention to provide a method whereby such vegetable comestibles may be impregnated with a liquid carrying, either in solution or in fine suspension, a solid or solids with which it may be desired to impregnate the comestible. The invention is applicable where it is desired to impregnate the comestible with coloring matter, nutrients, flavoring materials, medication, materials to set up within the comestible a desired chemical change, materials to inhibit, within the comestible, undesired chemical changes, or any other materials for any other purpose. Further objects of the invention will appear as the description proceeds.

I have found that, if a vegetable comestible is subjected to a subatmosphere pressure on the order of that indicated by a column of at least 10 inches of mercury, fluids naturally present within the comestible will be exuded. Best results may be obtained in some instances by using a vacuum as high as may be practicably obtainable. If, now, the vacuum is broken by the introduction into the chamber of a liquid to flood the comestible, that liquid will, to a large extent, take the place within the comestible of the fluids so exuded, the liquid filling, or substantially filling, the voids produced in the comestible by such exudation. Thereby, the comestible is more or less uniformly impregnated with the liquid; and, if that liquid carries in solution or in fine suspension, a solid or solids, the comestible will be similarly impregnated with the material so carried. In the claims appended hereto, I have used the term "solution" in its broadest sense to include liquids carrying solids in fine suspension.

Thus, a vegetable food product may be impregnated with water alone to increase the weight of a given volume of comestible; or it may be impregnated with coloring matter, nutrients capable of being carried in solution or in fine suspension, flavoring materials, medicaments, or chemicals capable of producing or accelerating desired chemical reactions, or capable of inhibiting or preventing undesired chemical reactions. Thereby, of course, the quality as to flavor, texture, or nutrient or therapeutic value of the comestible may be enhanced.

In some cases the impregnation may be accelerated or may be made more complete by applying superatmospheric pressure to the flooded comestible or by heating the liquid in contact with the comestible, or by following both of these courses. The impregnated comestible may be subsequently packed in suitable containers, sealed therein, and sterilized by subjecting the sealed containers to a sterilizing temperature for a suitable period; or the comestible may be drained of excess liquid and preserved by a freezing process.

One of the very valuable uses of the present invention concerns itself with controlling the character of the pectic substances contained in the comestible. It is known that most vegetable food products are made up of cells, the walls of which are formed primarily of cellulose, adjacent cells being bound together by lamella which are believed to be constituted primarily, if not entirely, of pectic substances. It is also known that, during the maturation and senescence of such edible substances, the pectic materials undergo changes. At the beginning of development of such edible articles, the pectic substance present is almost entirely protopectin or pectose. During maturation, the pectose is gradually changed, presumably by hydrolysis, into pectin so that, when the edible article is "dead ripe" the middle lamella are constituted almost entirely of pectin; and during senescence, the pectin is broken down, again presumably by hydrolysis, gradually through what are believed to be intermediate pectinic acids, until finally, when the edible article has reached its stage of absolute death, the pectic substances present are almost entirely in the form of pectic acid.

It is also known that the treatment of protopectin with acids or alkalies in solution under elevated temperatures accelerates the breakdown of the protopectin into pectin and the subsequent pectic substances. It is known, as well, that protopectin is substantially insoluble in water, that pectin is readily soluble in water, and that pectic acid is only slightly soluble in water, if at all, while the intermediate pectinic acids which are produced during the hydrolysis of pectin into pectic acid are progressively less and less soluble in water.

Taking advantage of these known facts, the present invention provides a method whereby vegetable comestibles may be packed for preserving without losing the physical characteristics commonly associated in the minds of the consuming public with fresh, ripe edible substances. Incidentally, through the use of the present preserving and packing method, the color, texture, firmness, crispness, and flavor of the food are retained more effectively than has been possible heretofore.

To the accomplishment of the above and related objects, my invention may be embodied in the steps described in the following specification, attention being called to the fact, however, that the specific procedures described are by way of illustration only and that changes may be made therein, so long as the scope of the appended claims is not violated.

It is well known that if vegetable food products are boiled in water, brine, or in their own juices, the texture is broken down, whereby the food products is softened and loses its crispness. Color changes also usually take place. It is my belief that these changes in texture, and possibly changes in color, are due to a conversion of the pectic substances into pectic acid and/or some of the intermediate pectinic acids. I have discovered that, if such food products are so treated as to convert substantially all of the pectic substances into pectin, without carrying the conversion to such an extent as to cause the production of material quantities of pectinic acids, the texture, and to a large extent the color, of the natural food will be retained. My invention, then, consists substantially in the provision of a preserving method whereby substantially all of the pectic substances present in the packed food product are in the form of pectin. Further, it is my present belief that, through the method hereinafter to be described, I have succeeded in increasing the pectin content of the food products above the amount naturally present therein.

According to standard practice heretofore followed in the preservation and packing of, for instance, apples, the apples have been peeled, cored, and sliced and dropped into a brine solution. The brine solution, containing approximately 0.1% salt, has been used primarily to prevent enzymic discoloration which notoriously takes place when apple meat is exposed to the air. The apple slices are held in this brine solution, at a temperature of about 120° F., for a period of approximately thirty minutes; whereafter they are wilted or blanched, by subjecting them to the heat of live steam, directly injected into the mass of apple slices. In this standard wilting process, the steam cooks and dilutes the food, and unavoidably, this cooking step causes hydrolyzation of the pectic substances to produce, to a marked extent, pectic acid and some of the intermediate pectinic acids.

I have learned that, in order to prevent the formation of pectinic acids and pectic acid, it is essential to control the pH value of the liquid in which the food product is soaked and initially heated. The optimum pH value varies somewhat, depending upon the particular food product being treated; but it may be said, in general, that, for optimum results, the pH value of the soaking liquid must be held below the pH value of the natural juice of the food product treated; and that the minimum limit is dependent solely upon economic considerations and questions of possible detriment to flavor and the well being of the consumer. An optimum pH value for the treatment of apples ranges between 2.8 and 3.4.

The brine solutions currently used in the standard commercial preservation and packing of apples have pH values which will range between 6.5 and 7.

Roughly stated, my process consists in preparing the food product by peeling, coring, slicing, or the like and submerging the articles or the pieces thereof in a solution having a pH value within the above-defined range, although preferably, of course, the pH value will be controlled within the optimum range. This solution may be acidulated water, suitably treated brine, or previously-extracted juice of the type of food product being processed, or a mixture of two or more of such solutions. The pH value of the solution may be adjusted and controlled by the addition of citric acid or of any other non-toxic organic or inorganic acid. This solution is preferably held at a pasteurizing temperature which may vary somewhat, depending upon the food product being processed, but which should be well below the boiling point of water. In general, the temperature of the solution will be held at a value somewhere between 110° F. and 140° F.; and the food product will be held in that solution for a time, likewise somewhat dependent upon the character of the product being processed, sufficient to permit the whole body of each article or piece to acquire substantially the temperature of the solution. During this time, control of the pH value of the solution within prescribed limits is essential.

This soaking and heating step tends to cause exudation of gases and juices naturally present in the food product, and to permit impregnation of the food product by the warm solution. Contact of the warm solution of controlled pH value with the protopectin of the food converts that protopectin into pectin; and it is my present belief that those portions of the protopectin of the food which are not directly contacted by the artificial solution will, when brought to the optimum temperature while in contact with the natural juices of the food, which have a pH value on the order of the optimum pH value of the artificial solution, be converted likewise to pectin.

The food product is now wilted or blanched by any desired known method, although I presently believe that it is best to carry out the wilting step at pressures of from 1 to 15 pounds gage, while the food product is immersed in the impregnating solution. The wilting process requires from ten to two minutes, depending upon the pressure used, the process requiring a longer period when lower pressures are used, of course. Pressures materially above 15 pounds gage are undesirable since they may cause penetration by the solution at such a rapid rate as to rupture the cells of the product being treated.

In the treatment of some vegetable comestibles, the preliminary soaking and heating step may be omitted. That is, it is sometimes sufficient to subject the natural comestible, from which portions to be discarded have been removed, to a vacuumizing step and subsequently to flood the comestible with the heated and controlled impregnating solution, without first soaking and heating the same as described above. Of course, in the treatment of comestibles which are subject to enzymic reaction upon exposure to air, the first step after peeling or the like will always be to submerge the comestible in a suitable substance, such as brine, to inhibit that enzymic reaction; and the above-described wilting step should usually be practiced after either impregnating step.

The food product is now packed into cans which are then filled with any suitable liquid, such as brine, syrup, or water; the cans are hermetically sealed, and are then sterilized in the standard manner. If the wilting step has been carried on under pressure, I have found that the sterilization time may be reduced from the usual ten to fifteen minutes to a period of from two to ten minutes.

I have found that the above process results in a finished product, the appearance, texture, and flavor of which more nearly approximates fresh, ripe food products of the same character than has heretofore been possible. I have found, also, that the weight of food packed into a can is higher than has heretofore been customary; and I believe that this increased weight is due to the fact that, because pectin has a known high affinity for water, the finished product contains a higher percentage of water than has been contained in food products packed under processes heretofore known.

The above description sets forth, in a general way, the procedure to be followed, in accordance with my invention, in the preservation and packing of any food product containing pectic substances; and I consider my invention to be as broad as is indicated by such description. By way of example, however, I append hereto a detailed description of the procedure to be followed in the preservation and packing of apples and in the preservation and packing of tomatoes.

Apples

It is customary in the trade to slice apples before packing. According to my method, the apples are peeled and sliced in the standard manner, and the slices are immediately immersed in a suitable solution. That solution may be apple juice adjusted to a pH value of 2.8 to 3.4 for optimum results, or the solution may consist merely of water of the same pH value, the acidity of the solution being produced by the addition of citric acid or any other non-toxic organic or inorganic acid. The apple slices are held in this solution at a temperature of 110° F. to 130° F. for varying periods, although I consider thirty minutes to be an optimum period for this step.

If it is not feasible to drop the apple slices immediately from the peeling and slicing station into the adjusted solution, they must be dropped immediately into a brine solution to inhibit any enzymic reaction.

It may be noted here that the above-mentioned temperature is not critical. While that temperature should not be materially exceeded, satisfactory results may be obtained with lower temperatures, except that, as the temperature decreases, the necessary soaking time is increased; the time increasing very rapidly upon relatively small decreases in temperature.

Alternatively, the apple slices, after submersion in the brine solution, are subjected to a vacuum, of any desired degree beyond that represented by a 10 inch column of mercury, for a period of from five to fifteen minutes. Preferably, the impregnating solution at the above temperatures will now be introduced into the vacuum chamber to break the vacuum and to flood the slices contained therein, and thereafter the pressure within the treating chamber is raised to a value of 1 to 15 pounds gage, these conditions being maintained for approximately ten minutes to two minutes, depending upon the pressures used. Obviously, the blanching step may, if desired, be carried on in another chamber; in which case the vacuum in the vacuumizing chamber will be broken, the apple slices removed therefrom and placed in another chamber, and thereafter the slices will be flooded with the heated impregnating solution, and a superatmospheric pressure will be applied thereto.

Whichever impregnating course has been followed, the slices are now drained and packed into cans, the cans being filled with a suitable liquid; and thereupon the cans are hermetically sealed and sterilized by subjection to a sterilizing temperature for from two to ten minutes.

Of course, apple products in forms other than slices may be preserved and packed in accordance with the above procedure.

Tomatoes

There is a decided market demand for canned, whole, firm tomatoes; but the packing industry has been unable to produce that product in satisfactory form. I have succeeded in producing canned, whole tomatoes having a texture at least as firm as that of ripe, fresh tomatoes. The previously cleaned, whole tomatoes are immersed in a vat containing the juice of good grade ripe tomatoes adjusted to a pH value of 3.8 to 4.5 by the use of any desired non-toxic acid. (While tomato juice is, in my opinion, definitely preferable, acidulated brine or water of proper pH value may be used in place thereof.) The tomatoes are held in this solution for a period of from five to fifteen minutes, the solution being at a temperature of 120° F. to 140° F., and the period of soaking varying with the size, ripeness, and the firmness of the fruit. The soaking period is determined by the time required for complete heat penetration of the fruit.

Without further ado, the tomatoes are removed from the soaking solution, and packed into cans, the cans are filled with tomato juice or not, as desired, and are then sealed and sterilized by subjecting the cans to a sterilizing temperature for a period of from five to twenty minutes. It is desirable that there shall be no intermediate cooling between the soaking step and the step of packing into the cans and sterilizing.

I have further found that vegetable comestibles, and particularly tomatoes, which have been subjected to the above-described treatment, may be frozen without detrimentally affecting the comestibles. Therefore, instead of packing the tomatoes, or other vegetable comestibles, in sealed cans and subjecting them to sterilizing temperature, they may be frozen in the open, or they may be packed in suitable containers and frozen within the containers.

In some cases, it may be desirable to subject the tomatoes to a subatmospheric pressure of relatively high degree before following the soaking and heating process above described.

My process, in effect, may be said to accelerate the natural ripening process of the food product, in that, within a relatively few minutes, the process causes the conversion of protopectin into pectin which, in nature, would require a period of days, weeks, or even months. On the other hand, the process, when properly practiced in accordance with the above instructions, appears to inhibit the hydrolysis of pectin into pectinic acids and pectic acid. I do not know the reason for this inhibitory effect.

It is important that the impregnating and heating step must not be carried on at temperatures approximating the boiling point of water. I have found that, if the temperature of the food product is raised too rapidly, the desired firmness of the finished product is not obtained.

Heat penetration, when the solution is held at a temperature close to the boiling point of water, is so rapid that the finished product is not sufficiently firm to conform to the objects of the present invention.

I claim as my invention:

1. In a method of preserving vegetable food products, the steps of subjecting a food product to a subatmospheric pressure, thereafter immediately flooding such food product with an aqueous solution of edible solids, applying superatmospheric pressure to the flooded food product, whereby such food product is impregnated with such solution, and elevating the temperature of such food product, while so flooded, to a value between 110° F. and 140° F.

2. In a method of preserving vegetable food products, the steps of subjecting a food product to a subatmospheric pressure, thereafter immediately flooding such food product with an aqueous solution of edible solids, applying superatmospheric pressure to the flooded food product, whereby such food product is impregnated with such solution, elevating the temperature of such food product, while so flooded, to a value between 110° F. and 140° F., draining excess solution from such food product, raising the temperature of such food product to at least 170° F. to stop certain enzymic reactions, and thereafter quick-freezing such food product.

3. In a method of preserving apples, the steps of peeling, coring, and slicing apples, immediately immersing the slices in a liquid inhibitory to enzymic reaction, heating the slices, while immersed in an aqueous solution having a pH value between 2.8 and 3.4, to a temperature between 110° F. and 130° F., applying a superatmospheric pressure to the flooded slices, draining the slices, packing and sealing the slices in suitable containers, and heating the slices, in such containers, to a sterilizing temperature.

4. In a method of preserving apples, the steps of peeling, coring, and slicing apples, immediately immersing the slices in a liquid inhibitory to enzymic reaction, holding the slices immersed for a period of approximately thirty minutes in an aqueous solution having a pH value between 2.8 and 3.4 and at a temperature between 110° F. and 130° F., and thereupon applying pressure of from one to fifteen pounds per square inch gage to the flooded slices for a period of ten minutes to two minutes, again draining the slices, packing and sealing the slices in suitable containers, and subjecting the filled containers to a sterilizing temperature for from two to ten minutes.

5. In a method of preserving tomatoes, the steps of immersing tomatoes in a liquid having a pH value of 3.8 to 4.5, heating the tomatoes, while so immersed, to a temperature of from 120° F. to 140° F., packing and sealing the tomatoes in suitable containers, and heating the tomatoes, in such containers, to a sterilizing temperature.

6. In a method of preserving tomatoes, the steps of immersing tomatoes in tomato juice adjusted, by the addition of a non-toxic acid, to a pH value of 3.8 to 4.5, heating the tomatoes, while so immersed, to a temperature of from 120° F. to 140° F., packing and sealing the tomatoes in suitable containers, and heating the tomatoes, in such containers, to a sterilizing temperature.

7. In a method of preserving tomatoes, the steps of immersing tomatoes in a liquid having a pH value of 3.8 to 4.5, heating the tomatoes, while so immersed, to a temperature of from 120° F. to 140° F., draining excess liquid from the tomatoes, and thereafter freezing the tomatoes.

8. In a method of preserving tomatoes, the steps of immersing tomatoes in tomato juice adjusted, by the addition of a non-toxic acid, to a pH value of 3.8 to 4.5, heating the tomatoes, while so immersed, to a temperature of from 120° F. to 140° F., draining excess liquid from the tomatoes, and thereafter freezing the tomatoes.

9. In a method of preserving vegetable comestibles, the steps of submerging a comestible in an aqueous solution having a pH value between 2.8 and 4.5 but lower than that of the natural juice of the product and having a temperature between about 110° F. and 140° F. for a period sufficient to heat the product to the temperature of the solution throughout, and removing the product from the solution.

10. In a method of preserving vegetable food products, the steps of subjecting a food product to a subatmospheric pressure on the order of that indicated by a 10-inch column of mercury and thereafter immediately flooding such food product with an aqueous solution having a pH value between 2.8 and 4.5 but lower than that of the natural juice of the product and chemically cooperative with the pectic substances inherent in such food product to convert protopectin into pectin.

11. In a method of preserving vegetable food products containing pectic substances, the steps of treating such food products to accelerate the conversion of protopectin to pectin and to inhibit hydrolysis of pectin toward pectinic and pectic acids, and thereafter heating such food products to a sterilizing temperature.

12. In a method of preserving apples, the steps of coring and peeling apples, subjecting the apples thereafter to a subatmospheric pressure on the order of that indicated by a 10-inch column of mercury to cause exudation of contained fluids from the apples, breaking the vacuum by the introduction of a flooding aqueous solution having a pH value between 2.8 and 3.4 and heating the apples while flooded by such solution to a temperature between 110° F. and 130° F., applying a superatmospheric pressure to the flooded apples to impregnate the same with such solution, whereby the conversion of protopectin toward pectin is accelerated in the apples, draining the excess solution from said apples, and packing the apples in suitable containers.

GEORGE A. FISHER.